(12) United States Patent
Tucker

(10) Patent No.: US 10,295,673 B1
(45) Date of Patent: May 21, 2019

(54) NESTED INTERFEROMETER FOR OPTICAL AUTOCOVARIANCE LIDAR

(71) Applicant: Ball Aerospace & Technologies Corp., Boulder, CO (US)

(72) Inventor: Sara C. Tucker, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/044,032

(22) Filed: Jul. 24, 2018

Related U.S. Application Data

(60) Provisional application No. 62/537,358, filed on Jul. 26, 2017.

(51) Int. Cl.
*G01S 17/95* (2006.01)
*G01S 7/486* (2006.01)

(52) U.S. Cl.
CPC ............ *G01S 17/95* (2013.01); *G01S 7/4861* (2013.01)

(58) Field of Classification Search
CPC ........ G01J 9/02; G01S 17/02; G01B 9/02027; G01B 9/02028; G01B 9/02049
See application file for complete search history.

(56) References Cited

U.S. PATENT DOCUMENTS

| 7,359,057 B2 | 4/2008 | Schwiesow |
| 7,929,215 B1 | 4/2011 | Grund et al. |
| 8,077,294 B1 | 12/2011 | Grund et al. |
| 2009/0091766 A1* | 4/2009 | Hirose .................... A61B 3/102 356/479 |
| 2017/0038192 A1* | 2/2017 | Chen ........................ G01B 9/02 |

OTHER PUBLICATIONS

Grund et al. "Development and Demonstration of an Optical Autocovariance Direct Detection Wind Lidar," Earth Science Technology Forum 2010, 2010, 6 pages.
Tucker et al. "The Athena-OAWL Doppler Wind Lidar Mission," EPJ Web of Conferences, 2016, The 27th International Laser Radar Conference (ILRC 27), vol. 119, 01002, 4 pages.
Tucker et al. "Comparing and contrasting the Optical Autocovariance Wind Lidar (OAWL) and coherent detection lidar," Coherent Laser Radar Conference, Barcelona, Spain, Jun. 17-20, 2013, 4 pages.

* cited by examiner

*Primary Examiner* — Jonathan M Hansen
(74) *Attorney, Agent, or Firm* — Sheridan Ross P.C.

(57) ABSTRACT

Lidar systems and methods are provided. The lidar system includes a laser that outputs light at two different wavelengths and an interferometer that is capable of generating fringe patterns for each of the two wavelengths simultaneously. More particularly, a first arm of the interferometer provides first and second path lengths. Light of a first of two or more wavelengths traverses the first path length within the first arm, while light of a second one of the two wavelengths traverses the second path length within the first arm. A second arm of the interferometer provides a third path length. Light from the first and second arms is then combined, and a phase shift of light of the first wavelength and a phase shift of light of the second wavelength are determined.

20 Claims, 7 Drawing Sheets

NESTED INTERFEROMETER FOR OPTICAL AUTOCOVARIANCE LIDAR

CROSS-REFERENCE TO RELATED APPLICATIONS

This application claims the benefit of U.S. Provisional Patent Application Ser. No. 62/537,358, filed Jul. 26, 2017, the entire disclosure of which is hereby incorporated herein by reference.

FIELD

The present disclosure is directed to an interferometer lidar system used to remotely measure wind speeds.

BACKGROUND

Light detection and ranging (lidar) systems have been developed that are capable of remotely measuring range-resolved wind speeds for use in various applications, including but not limited to weather forecasting, air quality prediction, air-traffic safety, and climate studies. Lidar systems have also been used in connection with remote sensing of chemical compounds, gases, and aerosol optical properties in the atmosphere, and surface chemistry and physical properties of hard targets. In general, lidar operates by transmitting light from a laser source to a volume or surface of interest and detecting the time of flight for the backscattered light to determine range to the scattering volume or surface.

A Doppler wind lidar also measures the Doppler frequency shift experienced by the light scattered back to the instrument due to the motions of molecules and aerosols (e.g. particles and droplets) in the atmospheric scattering volumes, which is directly tied to the speed of the wind in that volume, relative to the lidar line of sight (LOS). The wind speed along the LOS is determined by projecting the wind speed and direction (the wind vector) onto that LOS.

For large scale global weather forecasting, it is desirable to measure wind profiles over a wide range of atmospheric levels including lower atmospheric altitudes (e.g. the lower troposphere or up to approximately 2 km) where aerosols, including clouds (droplets), are more prevalent, and at higher altitudes (the upper troposphere and lower stratosphere, or 2 km-20 km) where aerosols may occasionally be present, but molecules are constantly present. Thus, for measuring full profile atmospheric winds, it is desirable to measure data from both aerosol returns and molecular returns. While both aerosol and molecular backscattered laser returns will see the same average wind-induced Doppler shift at their center frequency, aerosol backscattered returns have approximately the same illumination bandwidth as the laser light. Molecular backscattered returns, on the other hand, have a wide bandwidth due to the Doppler broadening induced by molecular vibration. Thus the two types of lidar returns will have different approaches to optimally estimating the change in center frequency.

Because molecular scattering is a function of wavelength to the inverse-fourth power, shorter wavelengths will scatter much more off molecules than longer wavelengths. The scattering ratio for aerosols is typically smaller. For this reason, molecular scatter wind lidar systems typically operate at the 355 nm wavelength, and aerosol scatter wind lidar systems can operate at longer wavelengths of 532 nm to 10 microns. Accordingly, hybrid lidar systems have been proposed that use 355 nm direct detection wind lidar for molecular returns, and 2 micron coherent detection wind lidar for aerosol returns. These hybrid systems thus require two different types of lasers, two different receivers, and expensive telescopes. In addition, such systems are bulky, have many points of potential failure, and are expensive to implement.

Another approach for measuring returns from both aerosols and molecules in the atmosphere combines a Fizeau spectrometer with a Fabry-Perot double-edge filter, both operating at the 355 nm wavelength. However, such filter-based systems have low receiver efficiencies, require significant laser and pointing stability, and still require multiple receivers, and therefore are relatively difficult and expensive to construct to obtain a desired sensitivity.

SUMMARY

In accordance with embodiments of the present disclosure, a multiple (e.g. dual) path length quadrature Mach-Zehnder wind lidar is provided. The lidar includes an interferometer operating at multiple wavelengths simultaneously. More particularly, the interferometer provides different optical path differences between the two interferometer arms for the different wavelengths to enable simultaneous measurement of lidar returns with different scattering bandwidths using different wavelengths.

A lidar system in accordance with embodiments of the present disclosure includes a light source that generates multiple wavelengths of light. The system additionally includes a telescope, and an unequal path length interferometer with multiple optical path length differences. The interferometer includes first and second arms each having different optical path lengths. More particularly, in accordance with embodiments of the present disclosure, the first arm of the unequal path length interferometer includes a first reflective element or set of reflective elements that present a first optical path length to light of a first wavelength included in the multiple wavelengths generated by the light source, and a second reflective element or set of reflective elements that present a second optical path length to light of a second wavelength included in the multiple wavelengths generated by the light source. The second arm of the interferometer includes a third reflective element or set of reflective elements that present a third optical path length to all wavelengths from the light source. The difference in the optical path lengths between the first arm and the second arm is therefore different for the two wavelengths. After light from the interferometer arms is recombined the interferometer additionally includes a first plurality of detectors configured to measure the intensity of the interference pattern formed by light of the first wavelength at different phase delay intervals, and a second plurality of detectors configured to detect an intensity of the interference pattern formed by light of the second wavelength at different phase delay intervals.

In accordance with embodiments of the present disclosure, the interferometer includes a first non-polarizing, dual wavelength, beam splitter that directs or transmits a first portion of received light to a first arm and a second portion of the received light to a second arm of the interferometer. The first arm includes a first reflective element that is a first distance from the first non-polarizing beam splitter. The first reflective element is a dichroic element that reflects light of a first wavelength and transmits light of a second wavelength. The first arm further includes a second reflective element that is a second distance from the first non-polarizing beam splitter, where the second distance is greater than the first distance. The second reflective element reflects light of the second wavelength. The second arm provides an optical path for a second portion of received light from the first non-polarizing beamsplitter, and includes a reflective element that is a third distance from the first non-polarizing beam splitter, where the third distance is less than either of the first and second distances in the first arm.

In accordance with further embodiments of the present disclosure, the interferometer system includes a quarter wave plate for introducing a delay to light of a certain polarization. The quarter wave plate can be in, for example, the optical path traversed by the first and second wavelength of light directed along the first arm of the interferometer.

In accordance with at least some embodiments of the present disclosure, light from the first and second arms is combined at a second non-polarizing beam splitter. A portion of the combined light is directed by the second dual-wavelength non-polarizing beam splitter to a first wavelength selective or dichroic element, while another portion of the combined light is directed by the second non-polarizing beam splitter to a second wavelength selective or dichroic element. Light of the first wavelength is reflected by the first wavelength selective element to a first polarizing beam splitter, while light of the second wavelength is passed by the first wavelength selective element to a second polarizing beam splitter. Light of the first wavelength is reflected by the second wavelength selective element to a third polarizing beam splitter, while light of the second wavelength is passed by the second wavelength selective element to a fourth polarizing beam splitter. In accordance with embodiments of the present disclosure, each of the first through fourth polarizing beam splitters is associated with first and second detectors, for a total of eight detectors. Moreover, for each polarizing beam splitter, a portion of the light received at each of the detectors associated with the respective polarizing beam splitter has been delayed by a selected amount within the instrument relative to other light.

In accordance with further embodiments of the present disclosure, the lidar system can include or is associated with a data processing and control system that includes a processor for executing application programming and memory for storing the application programming, data, and data products. The data processing and control system operates to determine a difference in the phase of the pulsed laser light received directly from the pulsed laser light source and the laser light backscattered from a target volume. More particularly, the data processing and control system can operate to fit a sinusoid to the points on the autocovariance function represented by the interference pattern, and can thus determine a phase of each of the measured autocovariance function signals from varying ranges. The data processing and control system can further calculate a speed of atmospheric aerosols and molecules along a line of sight at the volume of interest as an indication of atmospheric winds within a target volume.

In accordance with still other embodiments of the present disclosure, a method for remotely measuring winds is provided. The method includes determining a phase of an autocovariance function of light generated by a pulsed light source at each of at least first and second wavelengths at the time of the pulse, time-zero, or $t_0$. The method further includes transmitting light at the first and second wavelengths towards a target volume, and receiving a return signal that includes light of the first and second wavelengths that has been reflected from the target volume back to a telescope. The phases of autocovariance functions of the light in the return signal at each of the first and second wavelengths at a time $t>0$ are then determined. A Doppler shift amount can then be determined at a selected range or set of ranges by determining a difference in the phase of the measured autocovariance function of the light at each of the first and second wavelengths at $t_0$ and at $t>0$, where $t>0$ corresponds to a selected range.

More particularly, embodiments of the present disclosure can include directing a first portion of the light received at the instrument along a first arm of an interferometer. The first arm of the interferometer presents a first optical path distance to light of the first wavelength, and a second optical path distance to light of the second wavelength. A second portion of the light received at the instrument is directed along a second arm of the interferometer that presents a third optical path distance to light of the first and second wavelengths. Light from the first and second arms of the interferometer is combined, and the resulting interference patterns for the different wavelengths are observed at intervals of 90° of a phase of the received wavelength.

Additional features and advantages of embodiments of the disclosed systems and methods will become more readily apparent from the following description, particularly when taken together with the accompanying drawings.

DETAILED DESCRIPTION

Figure 1:
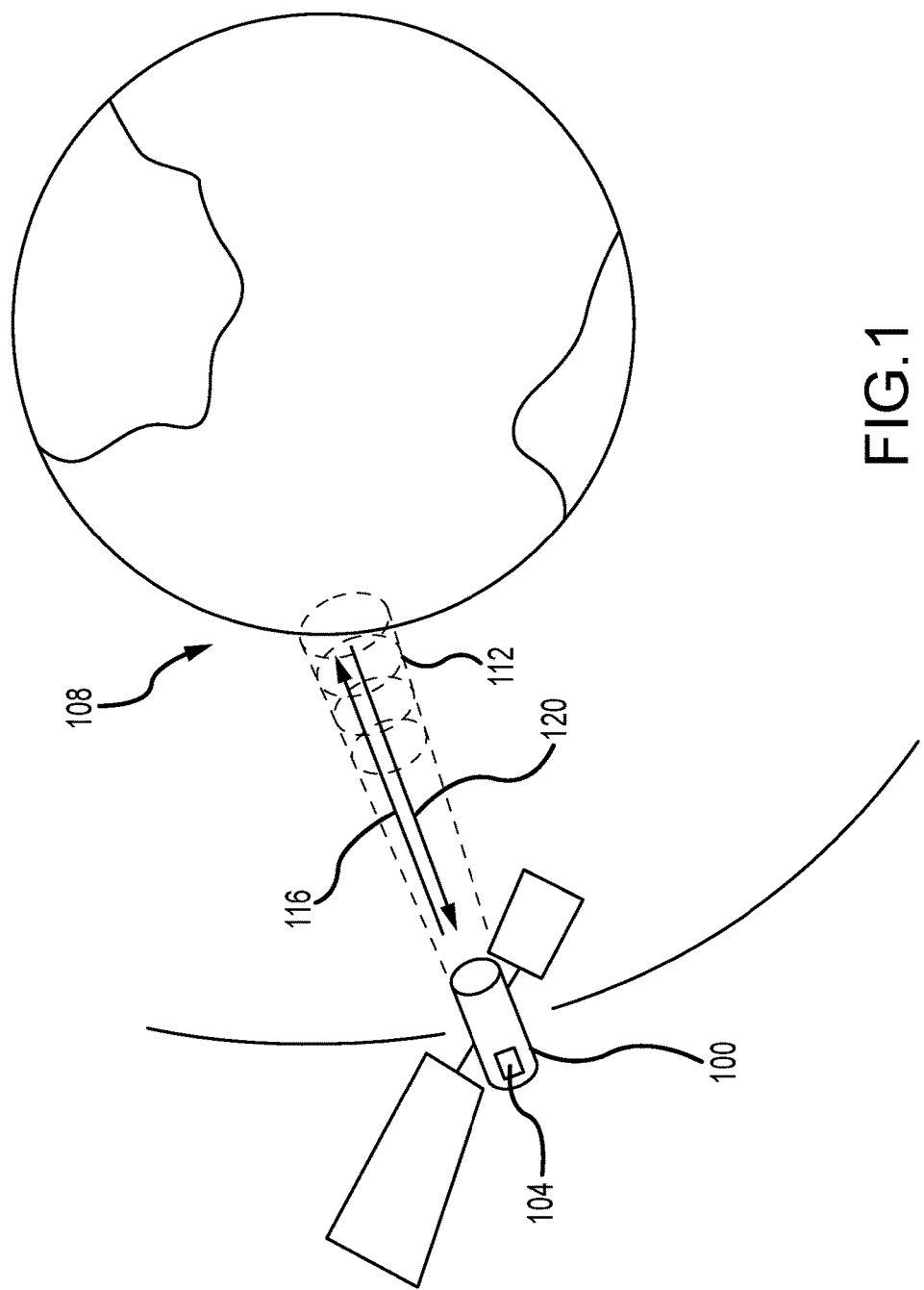
FIG. 1 is a depiction of a lidar system and an associated observation area in accordance with embodiments of the present disclosure.

FIG. 1 depicts a satellite 100 incorporating a lidar system 104 in accordance with embodiments of the present disclosure. In addition, an observation area 108 of the lidar system 104, and a target or target volume 112 within the observation area 108, are depicted. The figure also depicts an output signal or beam 116 and a received signal 120. The output beam 116 can include light at multiple wavelengths. The received signal 120 includes light from the output signal 116 that has been backscattered or reflected back toward the lidar system 104 by aerosols and molecules within the target volume 112. As shown, the satellite 100 carrying the lidar system 104 can, in accordance with embodiments of the present disclosure, be placed in a low earth orbit (LEO) or a geosynchronous earth orbit (GEO). Although this is one application of embodiments of the present disclosure, other applications may include placing a lidar system 104 in satellites at other orbits, in space vehicles, or in air, ship, or ground vehicles or locations, looking at the atmosphere either up from the surface or from above.

Figure 2:
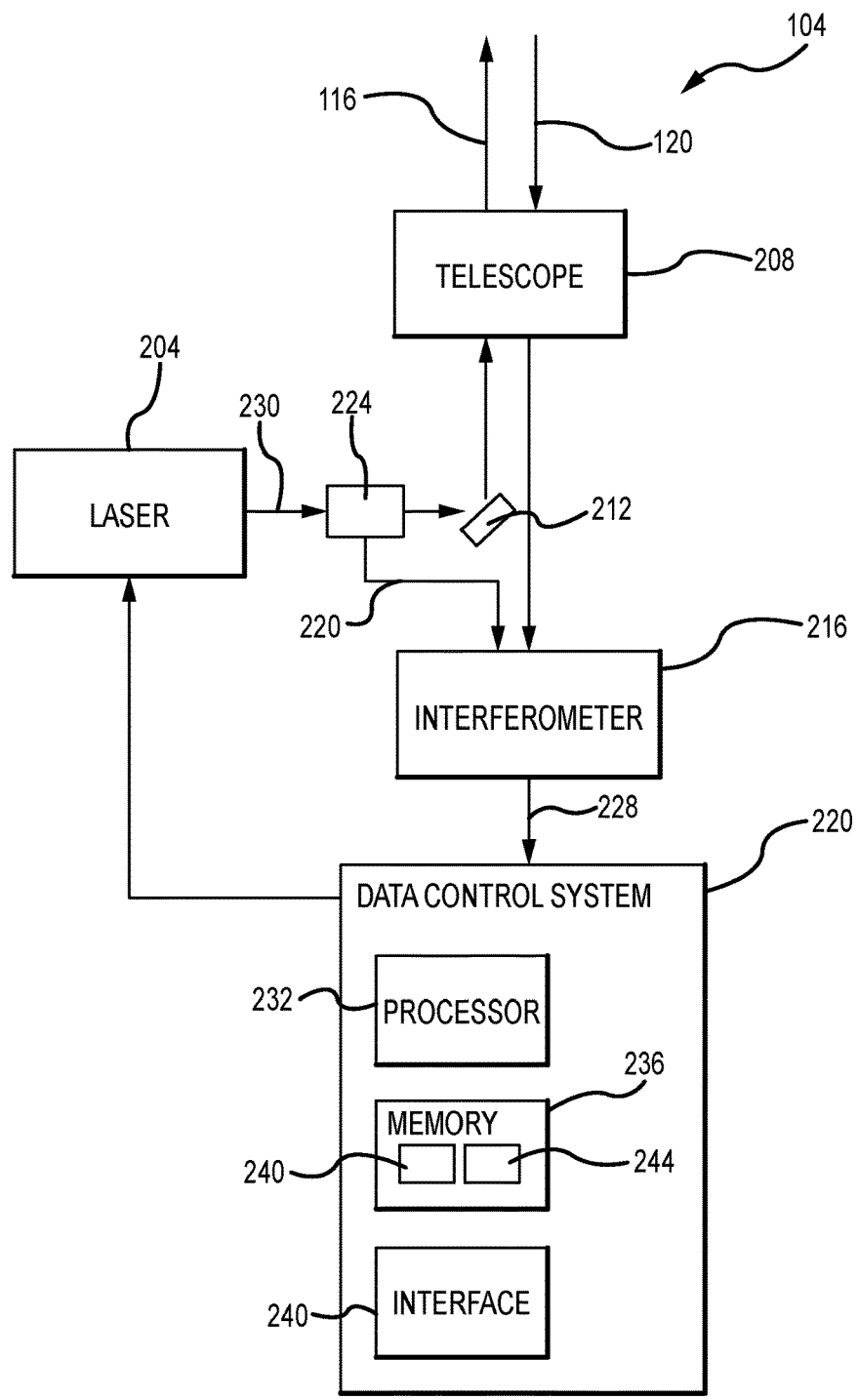
FIG. 2 is a depiction of components of a lidar system in accordance with embodiments of the present disclosure.

FIG. 2 illustrates components that may be included in a lidar system 104 in accordance with embodiments of the present disclosure. In particular, the lidar system 104 includes a light source 204, a telescope 208, an interferometer 216, and a data and control system 220. In addition, one or more mirrors 212, optical fibers 220, splitters 224, and signal lines 228 can be included for routing optical and electrical signals between components of the lidar system 104.

The light source 204 may comprise a pulsed laser, and produces output light 230 at two or more different wavelengths simultaneously. For example, the light source 204 can output light at wavelengths of 355 nm, 532 nm, and 1064 nm. A first or sample portion of the pulsed multi-wavelength light 230 output by the light source 204 is provided to the interferometer 216 while a second or output portion of the dual wavelength light 230 output by the light source 204 is delivered to the target volume 112. For example, but without limitation, a splitter 224 can be provided that directs a first portion of the dual wavelength light output by the light source 204 to the interferometer via a fiber 220, and that directs a second portion of the multiple wavelength light to the telescope 208 or directly to the atmosphere via a steering mirror 212. The first portion of the output light provided to the interferometer 216 from the light source may comprise a time-zero (t0) sample of the multi wavelength light 230 output by the light source 204. The second portion of the light is directed to the target volume 112 as output light 116. The multi-wavelength light reflected from the target volume 112 as the return signal 120 is collected by the telescope 208. Light included in the return signal 120 is then passed from the telescope 208 to the interferometer 216, and may comprise a t>0 return signal.

As discussed in greater detail elsewhere herein, the interferometer 216 determines a relative phase shift in the interferometer experienced by that portion of the output light 116 that has been returned to the lidar system 104 as the return signal 120 as a result of a relative line of sight velocity of the components in the target volume 112. The phase shift detected by the interferometer 216 can then be used to determine the Doppler frequency shift and thus the line of sight velocity of components within the target volume 112, such as aerosols and molecules in the atmosphere. More particularly, the phase shift information collected by the interferometer 216 is in the form of amplitudes of an interference pattern measured at multiple (e.g. four) locations along a waveform. Specifically, a phase is calculated from the relative amplitudes at the detectors of the interference pattern produced by the interferometer 216 using the t0 sample of the light output by the light source 204, and from the relative amplitudes at the detectors of the interference pattern produced by the interferometer 216 using the t>0 return light 120. The difference between the two calculated phases for light of a selected wavelength can then be used to calculate the relative line of sight velocity of particles in the target volumes 112.

A data processing and control system 220 can be provided as part of the lidar system 104 for controlling aspects of the operation of the lidar system 104, and for performing calculations based on the measurements made using the interferometer 216. In accordance with embodiments of the present disclosure, these calculations can include calculating the relative line of sight velocity of components of the atmosphere within a target volume 112. The data processing and control system 220 can generally include a processor 232, memory 236, and communications interface 240. The processor 232 can comprise a general purpose programmable processor, application specific integrated circuit, field-programmable gate array, computer, controller, or other device or element that is capable of executing instructions or code, for example stored as application software 240 and operating system software 244 in the memory 236 or other data storage. The application software 240 can be provided as an integrated program, a set of modules, or separate programs that perform different operations, including but not limited to the timing and control of the output of the light source 204, the pointing of the telescope 208 aperture or field of view, the processing of the measurements made by the detectors at different times for the determination of the phase of signals, the calculation of phase differences between t0 and t>0 signals, and the determination of relative line of sight wind speeds at known ranges from the lidar system 104. The memory 236 may comprise one or more memory components, including but not limited to solid-state memory devices, magnetic storage devices, optical storage devices, or the like. Moreover, the memory 236 can include more than one type of device. For example, at least portions of the application software 240 may be stored in nonvolatile, solid-state memory, while at least portions of operating system software 244 may be stored in a hard disk drive. In addition to software, the memory 236 can provide temporary or long term storage for data, intermediate data products, control inputs, or the like.

As described in greater detail elsewhere herein, the relative amplitude information from the dual wavelength light at times t0 and t>0 can be provided to a data and control system 220, to determine a phase shift and thus a frequency shift of the light in the return signal 120. The data and control system 220, using the processor 232 can then execute the application software 240 to determine the relative LOS velocity of the components within the target volume 112. This can be repeated at different times to obtain measurements from different ranges. The lidar system 104 applies the optical autocovariance technique to simultaneously implement range resolved measurements of wind-induced Doppler shifted frequency changes from molecular and aerosol returns. In accordance with further embodiments, the data processing and control system 220 can incorporate or operate in conjunction with the communications interface 240 for providing data to or receiving control signals from another system, such as but not limited to a remote system.

Figure 3:
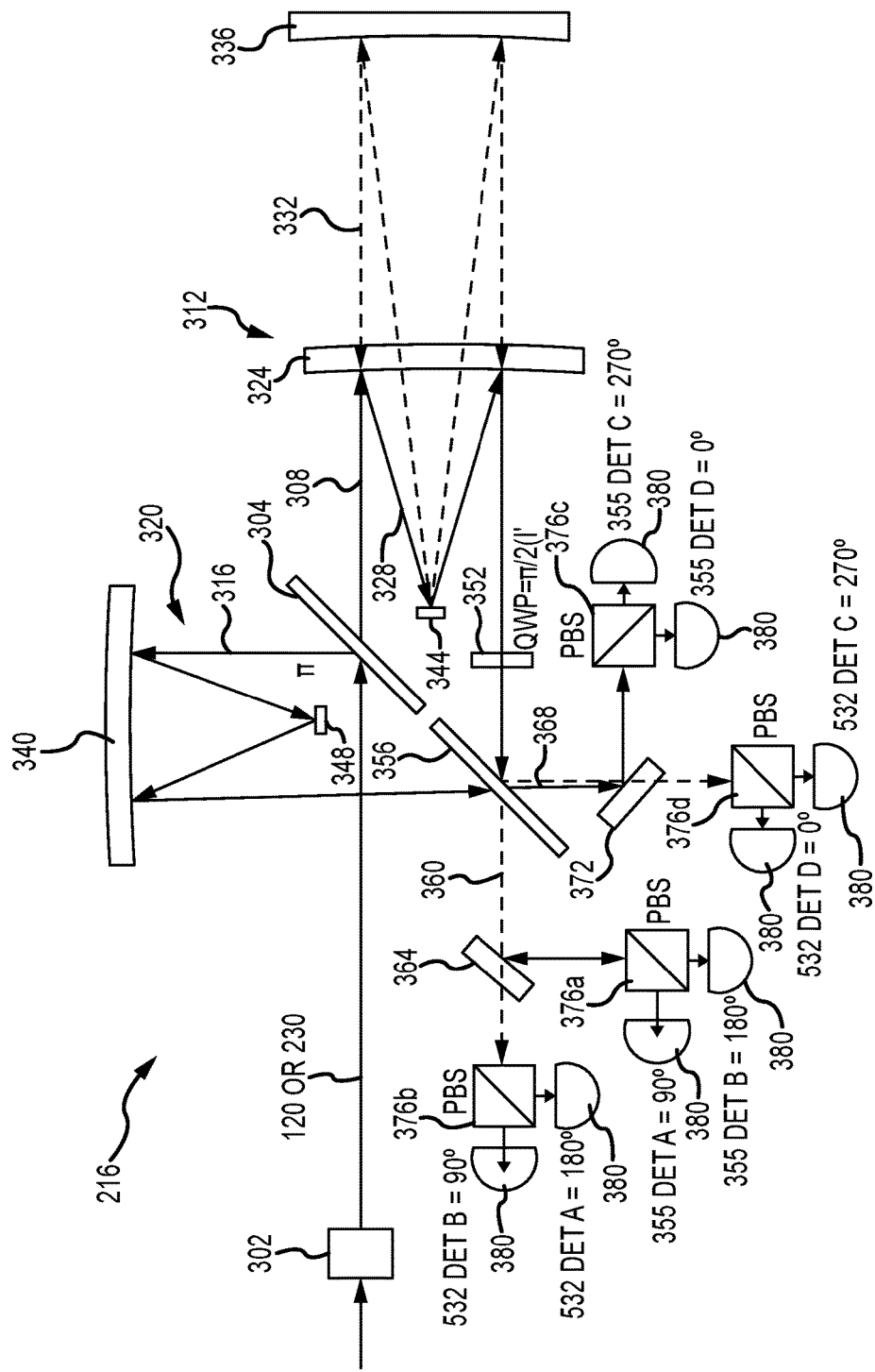
FIG. 3 is a depiction of components of a dual-path length interferometer in accordance with embodiments of the present disclosure.

With reference now to FIG. 3, components of an interferometer 216 in accordance with embodiments of the present disclosure are depicted. In general, the interferometer 216 receives dual wavelength light as an input. The light can comprise a time t0 sample of light 230 output by the light source 204, and a time t>0 signal comprising the return signal 120 collected by the lidar system 104. The light is passed to the interferometer 216 by a transmission element 302, such as a fiber optic element and/or turning mirror, that delivers light of a mix of different polarizations to the interferometer 216. In accordance with embodiments of the present disclosure, the interferometer system or instrument 216 includes a first dual-wavelength non-polarizing beam splitter 304 that directs or transmits a first portion 308 of the received light to a first arm 312 and a second portion 316 of the received light 300 to a second arm 320 of the interferometer 216.

The first arm 312 includes a first reflective element 324 that is a first distance from the first non-polarizing beam splitter 304. The first reflective element 324 reflects light of a first wavelength 328 and transmits light of a second wavelength 332. The first reflective element 324, optionally in combination with a secondary mirror 344, defines a first optical path length for light of the first wavelength 328 included in the portion of light directed to the first arm 312. In accordance with embodiments of the present disclosure, the first reflective element 324 is a frequency selective mirror or dichroic element. The first arm 312 further includes a second reflective element 336 that is a second distance from the first non-polarizing beam splitter 304, where the second distance is greater than the first distance. The second reflective element 336 reflects light of the second wavelength 332. The second reflective element 336, optionally in combination with the same secondary mirror 344, defines a second optical path length for light of the second wavelength 332 included in the portion of light directed to the first arm 312.

The second arm 320 includes a third reflective element 340 that is a third distance from the first non-polarizing beam splitter, where the third distance is less than either of the first and second distances. The third reflective element 340, optionally in combination with a secondary mirror 348, defines a third optical path length for the light of the first and second wavelengths included in the portion of the light directed to the second arm 320.

The first 312 and second 320 arms may be configured as cat-eye assemblies with reflective elements 324, 336, and 340 that comprise non-planar, for example parabolic, mirrors that are combined with secondary mirrors 344 and 348 to provide a compact physical structure that provides an optical path difference for rays within a given one of the arms 312 and 320 that is essentially constant for all rays of a given wavelength within the field of view of the interferometer 216, regardless of the angle at which the rays entered the assembly. Systems and methods for providing such a field widening lens are described in U.S. Pat. No. 7,929,215, the contents of which are incorporated herein by reference in their entirety.

In accordance with further embodiments of the present disclosure, one of the arms 312 or 320 of the interferometer 216 includes a quarter wave plate 352 for introducing a delay to light of a linear polarization. The quarter wave plate 352 can be in, for example, the optical path traversed by the light directed along the first arm 312 of the interferometer 216.

Light at both wavelengths from the first 312 and second 320 arms is combined at a second non-polarizing beam splitter 356. A first portion 360 of the combined light is directed (e.g. is passed) by the second non-polarizing beam splitter 356 to a first wavelength selective or dichroic element 364, while a second portion 368 of the combined light is directed (e.g. is reflected) by the second non-polarizing beam splitter 356 to a second wavelength selective or dichroic element 372.

Light of the first wavelength is reflected by the first wavelength selective element 364 to a first polarizing beam splitter 376a, while light of the second wavelength is passed by the first wavelength selective element 364 to a second polarizing beam splitter 376b. Light of the first wavelength is reflected by the second wavelength selective element 372 to a third polarizing beam splitter 376c, while light of the second wavelength is passed by the second wavelength selective element 372 to a fourth polarizing beam splitter 376d. In accordance with embodiments of the present disclosure, each of the first through fourth polarizing beam splitters 376 is associated with first and second detectors 380. Moreover, a portion of the light received at each of the detectors has been delayed by a selected amount within the instrument relative to other light. The detectors 380 may comprise photodetectors that are operative to detect an amplitude (intensity) of light incident thereon. Moreover, the detectors 380 can be selected and configured to operate at speeds that are fast enough to resolve return from different ranges, and thus from different portions of the target volume 112.

Specifically, light of the first wavelength that has traversed the first path length in the first arm 312 is combined with the light of the first wavelength that has traversed the third path length in the second arm 320, thus creating an interference pattern. The intensity of the interference pattern is measured at each of the detectors 380 associated with the first 376a and third 376c polarizing beam splitters, where the phase of the signals received at each of the detectors 380 are, through the combination of transmitting and reflecting elements within the interferometer 216, spaced from neighboring signals of the same wavelength by 90 degrees. Similarly, light of the second wavelength that has traversed the second path length in the first arm 312 is combined with the light of the second wavelength that has traversed the third path length in the second arm 320, and the intensity of the interference pattern is measured by each of the detectors 380 associated with the second 376b and fourth 376d polarizing beam splitters, where the interference pattern signals received at each of the detectors 380 are spaced from the other signals of the same wavelength by a nominal 90 degrees. Analysis can then be performed on the signals from each set of detectors (one set per wavelength) to determine a phase of the interferometer fringe (measured autocovariance function) of the light relative to the four detector phase positions. More particularly, the phase analysis procedure can be performed for each of the wavelengths at times to and t>0 to determine a relative phase change of the interferometer fringe (measured autocovariance function) of the light, from which a line of sight velocity of the atmospheric constituents from which the return light 120 was reflected may be retrieved.

Figure 4:
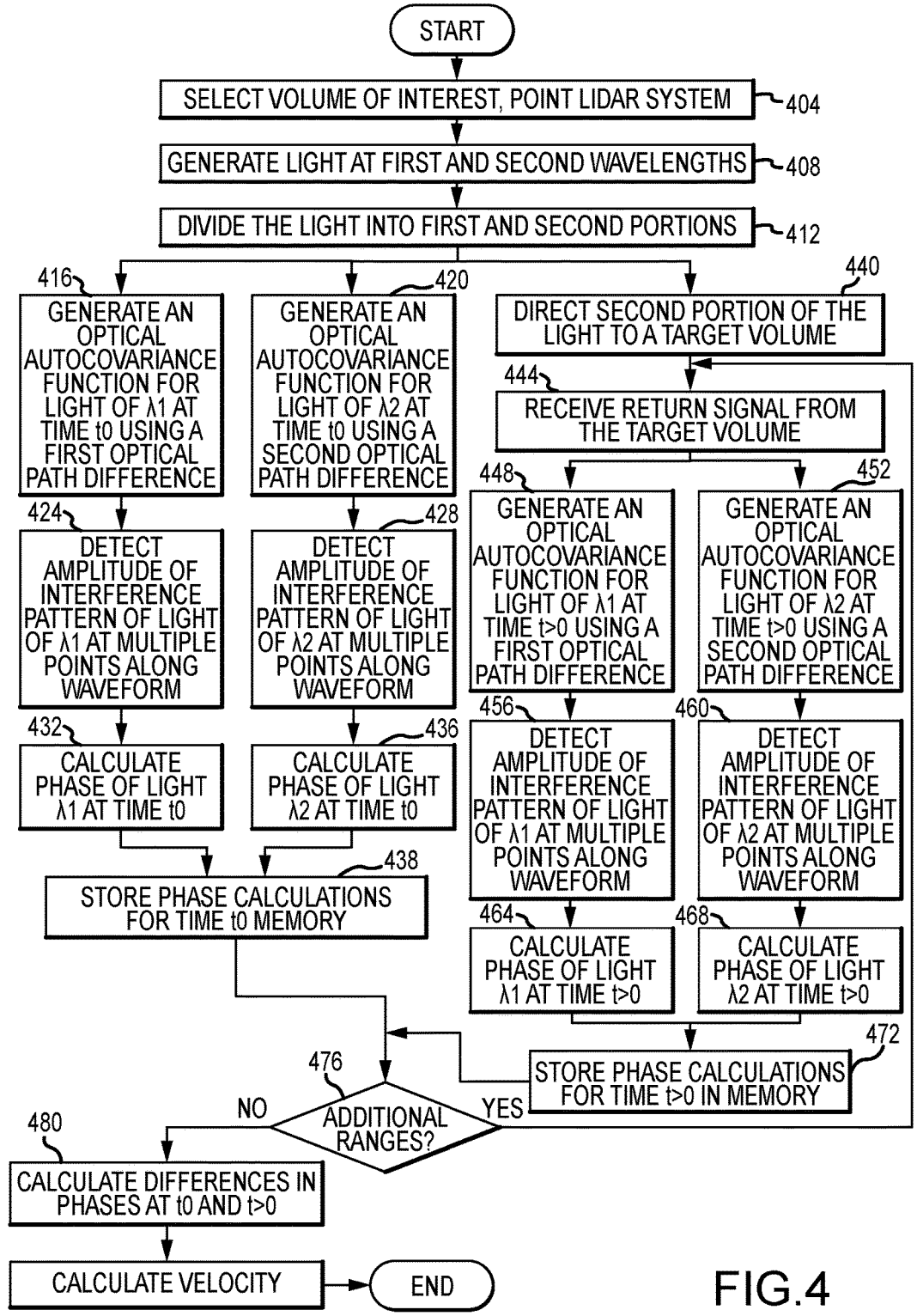
FIG. 4 depicts aspects of a method for remotely measuring wind speeds in accordance with embodiments of the present disclosure.

FIG. 4 is a flowchart depicting aspects of a method for measuring wind speeds in accordance with embodiments of the present disclosure. Initially, a volume of interest within the atmosphere is selected as a target volume 112, and the lidar system 104 is pointed towards that target volume 112 (step 404). Pointing the lidar system 104 can include positioning a satellite 100 or other vehicle carrying the lidar system 104 to point the lidar system 104 along a selected line of sight. Alternatively, or in addition, pointing the lidar system 104 can include operating a steering mirror 212 or otherwise changing the line of sight of the lidar system 104.

Once the lidar system 104 has been pointed towards the volume of interest 112, the light source 204 is operated to generate a pulse of output light 230 at multiple wavelengths simultaneously (step 408). For example, but without limitation, the output light 230 can include light at two or more different wavelengths. For instance, the first wavelength can be 355 nm, and the second wavelength can be 532 nm. As can be appreciated by one of skill in the art after consideration of the present disclosure, light at a wavelength of 532 nm is reflected by aerosols and molecules in the atmosphere, and light at a wavelength of 355 nm is reflected by aerosols and by molecules even stronger then 532. The dual wavelength output light 230 is divided into first and second portions by, for example, a splitter 224 (step 412).

Figure 5:
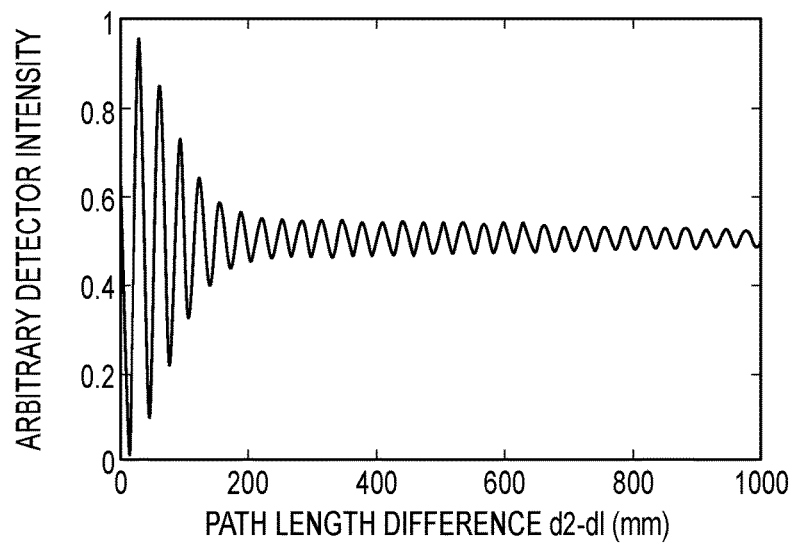
FIG. 5 depicts an autocovariance function.

The first portion of the output light 230 is supplied to the interferometer 216 as a time t0 sample of the output light 230. At step 416, a first interference pattern or autocovariance function is generated using light of the first wavelength included in the time t0 sample. An interference pattern described by an example autocovariance function is depicted in FIG. 5. As can be seen from the figure, the autocovariance function describes an interference or fringe pattern that varies between 0 and some maximum intensity at the extreme, and that generally becomes less distinct as the path length difference (i.e. the difference between the optical path lengths of the first 312 and second 320 arms of the interferometer 216) increases.

As a particular example, the light of the first wavelength in the time t0 sample can be divided by the first non-polarizing beam splitter 304 into a portion passed along the first arm 312, and a portion reflected to the second arm 320 of the interferometer 216. The light of the second wavelength is reflected by the first reflective element 324 in the first arm 312, and by the third reflective element 340 in the second arm 320. One or both of the arms 312 and 320 can additionally include a secondary mirror 344, 348, to provide a folded optical path, thereby increasing the optical path length of the associated arm 312 or 320. The light from the arms 312 and 320 is then recombined at the second non-polarizing beam splitter 356, forming the interference pattern.

At step 420, a second interference pattern or autocovariance function is generated using light of the second wavelength included in the time t0 sample. The process of forming the second interference pattern is similar to the process of forming the first interference pattern, except that the light of the second wavelength is passed by the first reflective element 324 of the first arm 320, and is instead reflected by the second reflective element 336 of the first arm 320. Notably, the steps 416 and 420 of forming interference patterns of the first and second wavelengths included in the time t0 sample are initiated simultaneously.

Figure 6:
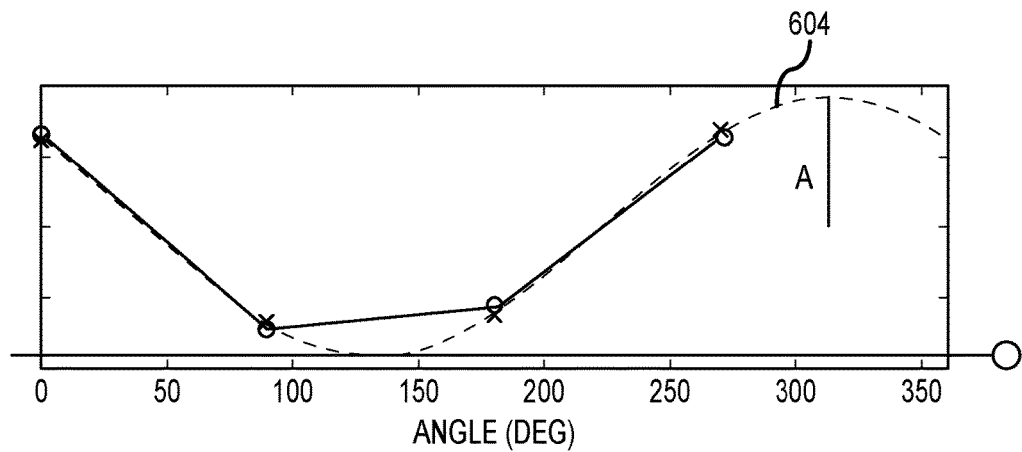
FIG. 6 depicts the measurement of a waveform using a plurality of detectors spaced at intervals along the waveform.

At step 424, the amplitude of the interference pattern generated using the light of the first wavelength included in the time t0 sample of the output light 230 is measured using a first set of detectors 380. In accordance with embodiments of the present disclosure, the detectors 380 are configured to receive light at different intervals along the waveform of the interference pattern, across a span of one wavelength or less of the waveform. For example, the detectors 380 in the first set of detectors are configured so that they each detect an intensity of the light in the interference pattern at a point that is spaced by a nominal 90 degrees, of the phase of the pattern from the next closest detector 380. For instance, the detectors could be configured to detect the 0, 90, 180, and 270 degree phases of the interferometric signal. This is illustrated in FIG. 6, which depicts the measurement of a waveform 604 comprising an interference pattern produced by an interferometer 216 using detectors 380 spaced at about intervals of 90 degrees, +/−5 degrees, along the waveform. As shown in the figure, the waveform 604 generally has phase and amplitude attributes, and can include a constant offset (O) that typically results from the presence of background noise in the signal. Similarly, at step 428, the amplitude of the interference pattern generated using the light of the second wavelength included in the time $t_0$ sample of the output light 230 is measured using a second set of detectors 380. Like the first set of detectors, the detectors 380 in the second set are separated from one another on the fringe by about 90 degrees. In accordance with other embodiments of the present disclosure, the spacing between detectors that receive light of a selected wavelength can be different than a nominal 90 degrees. For instance, the detectors for a given wavelength of light in the return signal 120 can have a spacing on the fringe of 60 degrees.

The phase of the light of the first wavelength included in the time $t_0$ sample 230 is then calculated from the intensities detected at intervals along the waveform of the interference pattern comprising light of the first wavelength (step 432). Calculating the phase of the light can be performed by fitting a sinusoid (amplitude and phase) to the detected intensities, as conceptually depicted by the waveform 604 in FIG. 6. Similarly, the phase of the light of the second wavelength included in the time t0 sample 230 is calculated from the intensities detected at intervals along the interference pattern including the light of the second wavelength (step 436). The phase calculations for the different wavelengths can then be stored in memory 236 (step 438).

The second portion of the light, which was divided from the first portion of the light by the splitter 224 at step 412 is directed to the selected target volume 112 (step 440). More particularly, the second portion of the light can be directed to the target volume 112 by the mirror 212 directly, or through the telescope 208 as an output signal 116. As can be appreciated by one of skill in the art after consideration of the present disclosure, particles in the atmosphere, including aerosols and molecules, can reflect at least some of the light in the output signal 116 as a 180 degree backscattered return signal 120 (step 444). At step 448, an optical autocovariance function for light of the first wavelength at time t>0 is generated, and simultaneously, at step 452, an optical autocovariance function for light of the second wavelength at time t>0 is generated. The amplitude of the interference pattern of the light of the first wavelength at time t1, where t1 is greater than zero, is then detected at multiple points along the waveform described by the autocovariance function of that light (step 456). Similarly, the amplitude of the interference pattern of the light of the second wavelength at time t1 is detected at multiple points along the waveform described by the autocovariance function of that light (step 460). At step 464 the phase of the light of the first wavelength at time t1 is calculated, and at step 468, the phase of the light of the second wavelength at time t1 is calculated. The calculated phases for the wavelengths at time t1 can then be stored in memory (step 468).

At step 476, a determination can be made as to whether measurements of relative line of sight wind speeds at other (greater) ranges are desired. As can be appreciated by one of skill in the art after consideration of the present disclosure, the range of the particles that reflected the light as a return signal 120 relative to the lidar system 104 can be determined by the time of flight of the light as it travels from the lidar system to the volume of interest 112, and the back to the lidar system 104. Accordingly, the range from which relative line of sight wind measurements are made can be determined by selecting the time at which the intensity measurements along the waveform are made. If measurements at additional ranges are desired, the process can return to step 444, and the amplitudes at the detectors 380 for the different wavelengths can measure the intensities of the waveforms at time t1+i, where i, is a selected time interval.

Figure 7:
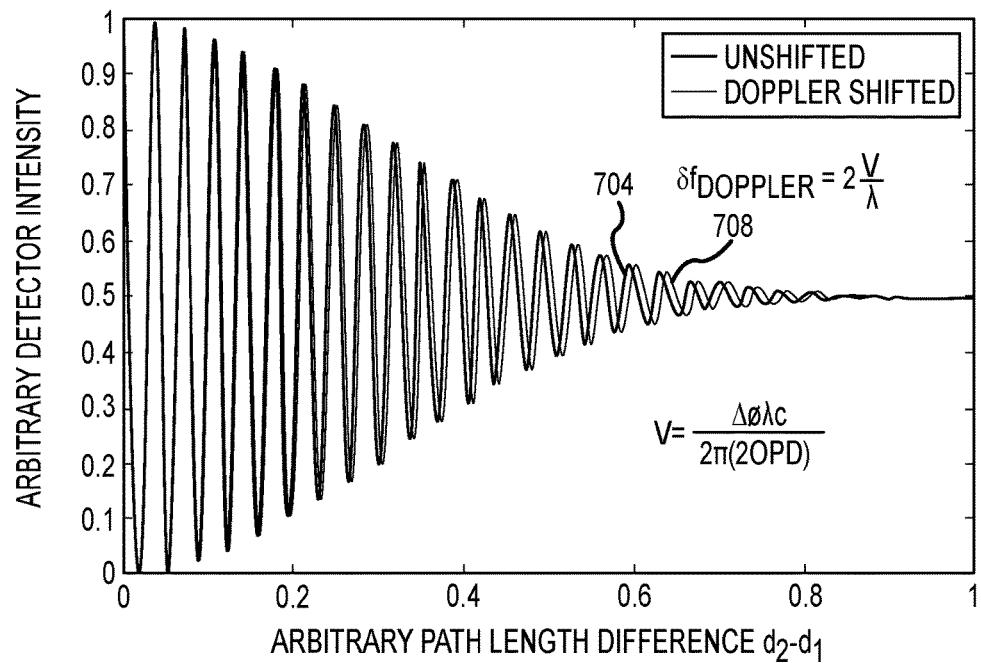
FIG. 7 depicts autocovariance functions for unshifted and Doppler-shifted signals.
Figure 8:
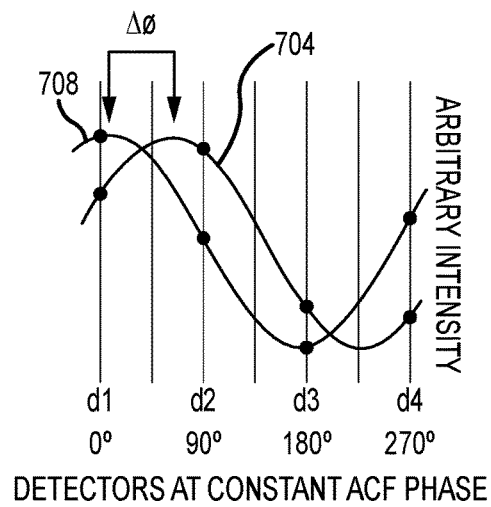
FIG. 8 depicts the measurement of the phase of the autocovariance functions of unshifted and Doppler-shifted light relative to a set of detectors.

At step 480, the difference in the phase of the sample light of the first wavelength at time t0 and the phase of the returned light of the first wavelength at a selected time t>0 is determined, and the difference in the phase of the sample light of the second wavelength at time t0 and the phase of the returned light of the second wavelength at the selected time t>0 is determined. The relative line of sight wind speeds for each of the wavelengths at a selected range from the lidar system 104 are then calculated from these differences (step 484). More particularly, where a signal of a selected wavelength has been Doppler shifted due to reflection by a moving particle, the wavelength of that signal will be altered. As illustrated in FIG. 7, this results in an autocovariance function for the returned light 704 that is slightly different than the autocovariance function of the unshifted (i.e. the outgoing or t0) light 708. This difference can be detected by comparing a difference between a phase of the original optical autocovariance signal 708 (i.e. the t0 signal) and the phase of the time shifted optical autocovariance signal 704 (i.e. the t>0 signal). The difference in phase is illustrated in FIG. 8, which depicts an autocovariance function of the t0 version of a signal 708 versus a t>0 version of the signal 704 that has been Doppler shifted. As can be appreciated by one of skill in the art, the change in phase is related to velocity, as shown in the following expression:

$$V = \frac{\Delta \phi \lambda_c}{2\pi(2OPD)}$$

where V is the relative line of sight velocity of the particles in the atmosphere, $\Delta\phi$ is the difference in phase, $\lambda_c$ is the nominal wavelength of the signal, and OPD is the optical path difference between the first (or second) optical path length presented to the light by the first arm 312 and the optical path length of the second arm 320. Moreover, in the return signal, each cycle of the autocovariance function contributes a little more of the Doppler shift-induced phase offset. Accordingly, by providing a suitably large optical path difference, the total number of cycles multiplied by the wavelength difference per cycle results in a wavelength offset that is more easily measured. For example, for a 10 m/s line of sight wind speed, a 532 nm signal will experience a change in frequency of 37.6 MHz, and a change in wavelength of $3.55 \times 10^{-5}$ nm. This change in wavelength divided by the nominal wavelength gives a wavelength fraction per cycle of $6.67 \times 10^{-8}$, which is very difficult to measure. However, for a 1 m long optical path difference, there are about $1.9 \times 10^6$ cycles of the wavelength, resulting in a wavelength offset of about 0.13 fractions of a wavelength, or 0.82 radians, which is much more easily measured.

Figure 9:
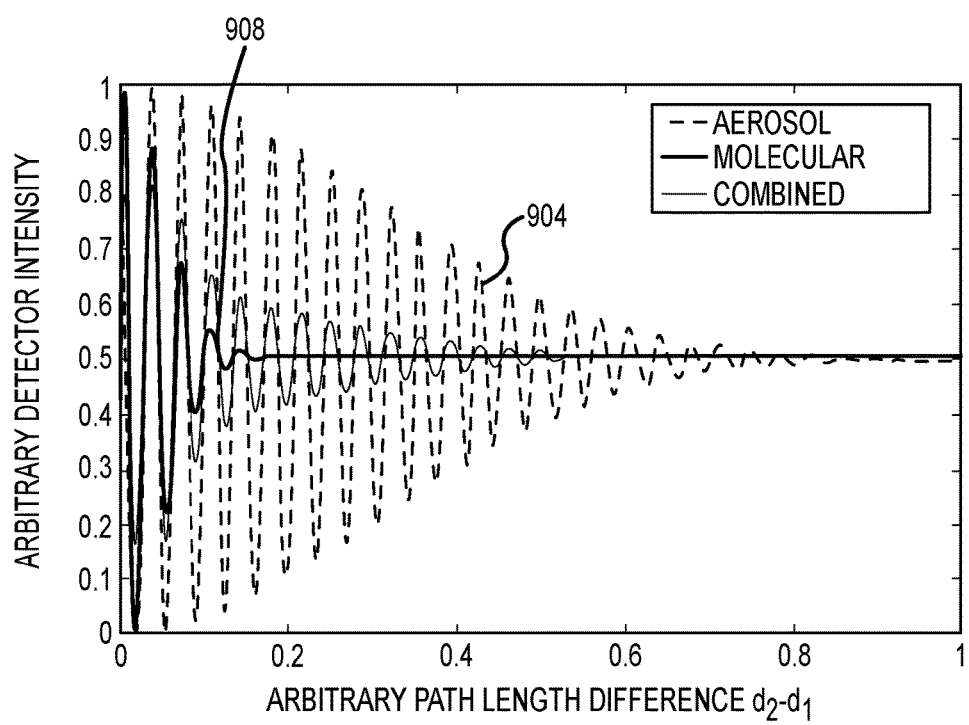
FIG. 9 depicts autocovariance functions of signals produced by different sources.

As depicted in FIG. 9, different reflection sources produce different autocovariance functions. In particular, an aerosol return 904 has a narrower bandwidth and exhibits non-zero autocovariance fringe contrast out to relatively long optical path differences. A molecular return 908 has a broader bandwidth, and has an autocovariance function that quickly drops off with increasing optical path difference. For a larger ambiguity interval and more fringe visibility, an optical path difference that is relatively short compared to the autocovariance function is desirable. For larger phase to velocity mapping and less blurring of the return caused by the inclusion of a molecular return, a relatively long optical path difference is desirable. Accordingly, it is desirable to have both a relatively short optical path difference, to enable measurement of the phase shift experienced by light having a relatively broad bandwidth, and a relatively long optical path difference, to enable precise measurement of the phase shift experienced by light having a relatively narrow bandwidth separately from the light of a relatively broad bandwidth. In an interferometer 216 in accordance with embodiments of the present disclosure, the first arm 312 presents different optical path lengths to signals of the first and second wavelengths. In particular, an interferometer 216 as disclosed herein provides a shorter optical path difference for light of a first wavelength, such as a wavelength of 355 nm, which is reflected by both aerosols and strongly by molecules in the atmosphere, and a longer optical path difference for the light of the second wavelength, such as a wavelength of 532 nm, which is reflected by aerosols in the atmosphere, but less so by molecules than the shorter 355 nm wavelength.

Although elements of methods in accordance with embodiments of the present disclosure have been illustrated and discussed in a particular order, other arrangements are within the scope of the present disclosure. For example, various calculations can be performed continuously while data is being collected from different ranges. In addition, various steps of the process of detecting and calculating wind speeds can be performed while different pulses of light are being output.

The foregoing discussion of the disclosed systems and methods has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:
1. An interferometer, comprising:
a first non-polarizing dual-wavelength beam splitter;
a first arm, wherein the first arm provides an optical path for light that is a first one of reflected or transmitted by the first non-polarizing beam splitter, the first arm including:
a first reflective element, wherein the first reflective element of the first arm reflects light of a first wavelength and transmits light of a second wavelength, and wherein the first reflective element of the first arm is a first distance from the first non-polarizing beam splitter; and
a second reflective element, wherein the second reflective element of the first arm reflects light of the second wavelength, wherein the second reflective element of the first arm is a second distance from the first non-polarizing beam splitter, and wherein the second distance is greater than the first distance;
a second arm, wherein the second arm provides an optical path for light that is a second one of reflected or transmitted by the first non-polarizing beam splitter, the second arm including:
a first reflective element, wherein the first reflective element of the second arm is a third distance from the first non-polarizing beam splitter, and wherein the third distance is different than the first and second distances;
a dual-wavelength quarter wave plate, wherein the quarter wave plate is located along the optical path of one of the first arm and the second arm; and
a second non-polarizing dual-wavelength beam splitter, wherein the second non-polarizing beam splitter receives light reflected from the first and second reflective elements of the first arm and from the first reflective element of the second arm.

2. The interferometer of claim 1, further comprising:
a first dichroic element, wherein the first dichroic element receives light that is a first one of reflected or transmitted by the second non-polarizing beam splitter, wherein the first dichroic element reflects light of a selected wavelength and transmits light of another wavelength;
a second dichroic element, wherein the second dichroic element receives light that is a second one of reflected or transmitted by the second non-polarizing beam splitter, wherein the second dichroic element reflects light of a selected wavelength and transmits light of another wavelength.

3. The interferometer of claim 2, further comprising:
a first polarizing beam splitter, wherein the first polarizing beam splitter receives light that is a first one of reflected or transmitted by the first dichroic element;
a second polarizing beam splitter, wherein the second polarizing beam splitter receives light that is a second one of reflected or transmitted by the first dichroic element;
a third polarizing beam splitter, wherein the third polarizing beam splitter receives light that is a first one of reflected or transmitted by the second dichroic element;
a fourth polarizing beam splitter, wherein the fourth polarizing beam splitter receives light that is a second one of reflected or transmitted by the second dichroic element.

4. The interferometer of claim 3, further comprising:
a plurality of detectors, wherein
  a first one of the detectors receives light that is reflected by the first polarizing beam splitter;
  a second one of the detectors receives light that is transmitted by the first polarizing beam splitter;
  a third one of the detectors receives light that is reflected by the second polarizing beam splitter;
  a fourth one of the detectors receives light that is transmitted by the second polarizing beam splitter;
  a fifth one of the detectors receives light that is reflected by the third polarizing beam splitter;
  a sixth one of the detectors receives light that is transmitted by the third polarizing beam splitter;
  a seventh one of the detectors receives light that is reflected by the fourth polarizing beam splitter;
  an eighth one of the detectors receives light that is transmitted by the fourth polarizing beam splitter.

5. The interferometer of claim 4, wherein the detectors are photodetectors.

6. The interferometer of claim 4, wherein an interference pattern received at a detector receiving light reflected by a first one of the polarizing beam splitters is delayed by a nominal 90 degrees relative to an interference pattern received at another detector receiving light from the first one of the polarizing beam splitters.

7. The interferometer of claim 1, wherein the third distance is less than either of the first and second distances.

8. The interferometer of claim 1, wherein the first arm further includes a secondary mirror, and wherein the second arm further includes a secondary mirror.

9. The interferometer of claim 8, wherein an optical path difference for rays within a given one of the arms and for a given one of the wavelengths is the same for any angle of incidence of the rays.

10. A system, comprising:
a light source, wherein the light source outputs light having a first wavelength and light having a second wavelength;
a telescope;
an interferometer, including:
  a first non-polarizing beam splitter, wherein the first non-polarizing beam splitter receives light from the telescope;
  a first arm, wherein the first arm receives light that is a first one of reflected or transmitted by the first beam splitter, wherein the first arm provides a first optical path length for light having the first wavelength, and wherein the first arm provides a second optical path length for light having the second wavelength;
  a second arm, wherein the second arm receives light that is a second one of reflected or transmitted by the first beam splitter, and wherein the second arm provides a third optical path length;
  a second non-polarizing beam splitter, wherein light from the first and second arms are incident on the second beam splitter and form interference patterns, wherein a first portion of the incident light is passed to a first dichroic followed by two polarizing beam splitters, and wherein a second portion of the incident light is passed to a second dichroic followed by two polarizing beam splitters; and
  a plurality of detectors, wherein a first one of the detectors receives a component of light that is separated in phase from light received by a second one of the detectors.

11. The system of claim 10, wherein each of the detectors detects an intensity of light incident on the detector.

12. The system of claim 10, wherein the light source is a dual wavelength laser.

13. The system of claim 12, further comprising:
a beam splitter with an input that receives light output by the laser, wherein a first output of the beam splitter directs light to the interferometer, and wherein a second output of the beam splitter directs light to the telescope.

14. A method for measuring atmospheric winds, comprising:
reflecting light of first and second wavelengths from a target volume;
receiving the reflected light;
delaying a portion of the received light of the first wavelength by a first amount;
delaying a portion of the received light of the second wavelength by a second amount;
delaying another portion of the received light of the first wavelength by a third amount;
delaying another portion of the received light of the second wavelength by the third amount;
mixing the portion of the received light delayed by the first amount with some of the portion of the received light delayed by the third amount and detecting an amplitude of the mixed light at three or more intervals; and
mixing the portion of the received light delayed by the second amount with some of the portion of the received light delayed by the third amount and detecting an amplitude of the mixed light at three or more intervals.

15. The method of claim 14, wherein the delaying and mixing processes are performed using an interferometer having first and second arms, and wherein the first arm presents a first optical path length to light of the first wavelength and a first bandwidth, and presents a second optical path length to light of the second wavelength and a second bandwidth.

16. The method of claim 15, further comprising:
generating the light of the first wavelength and the light of the second wavelength using a light source;
providing a sample of the light having the first wavelength and of the light having a second wavelength generated by the light source to the interferometer;
delaying a portion of the received light of the first wavelength by a first amount;
delaying a portion of the sample of light of the second wavelength by a second amount;
delaying another portion of the sample of light of the first wavelength by a third amount;
delaying another portion of the sample light of the second wavelength by the third amount;
mixing the portion of the sample of light delayed by the first amount with some of the portion of the sample of light delayed by the third amount and detecting an amplitude of the mixed light at three or more intervals; and
mixing the portion of the sample of light delayed by the second amount with some of the portion of the sample light delayed by the third amount and detecting an amplitude of the mixed light at three or more intervals.

17. The method of claim 16, further comprising:
wherein the three or more intervals span a distance of less than one wavelength of the respective first and second wavelengths.

18. The method of claim 17, wherein the amplitudes are measured at four intervals, and wherein the intervals are spaced apart from one another by about 90 degrees.

19. The method of claim 16, further comprising:
calculating a phase change of the received light of the first wavelength relative to the sampled light of the first wavelength;
calculating a phase change of the received light of the second wavelength relative to the sampled light of the second wavelength; and
calculating a wind speed using at least one of the calculated phase changes.

20. The method of claim 19, further comprising:
directing light of the first and second wavelengths to the target volume.

* * * * *